United States Patent
Gysling (10) Patent No.: US 11,946,787 B2
(45) Date of Patent: Apr. 2, 2024

(54) METHOD TO QUANTIFY THE EFFECTS OF DECOUPLING IN CORIOLIS METERS WITH BUBBLE COALESCENCE

(71) Applicant: CORVERA LLC, South Glastonbury, CT (US)

(72) Inventor: Daniel Gysling, South Glastonbury, CT (US)

(73) Assignee: CORVERA LLC, South Glastonbury, CT (US)

( * ) Notice: Subject to any disclaimer, the term of this patent is extended or adjusted under 35 U.S.C. 154(b) by 118 days.

(21) Appl. No.: 17/656,771

(22) Filed: Mar. 28, 2022

(65) Prior Publication Data

US 2022/0307960 A1 Sep. 29, 2022

Related U.S. Application Data

(60) Provisional application No. 63/166,473, filed on Mar. 26, 2021.

(51) Int. Cl.
*G01F 1/84* (2006.01)
*G01N 9/32* (2006.01)

(52) U.S. Cl.
CPC .................................... *G01F 1/84* (2013.01); *G01N 9/32* (2013.01)

(58) Field of Classification Search
CPC .................................... G01F 1/84; G01N 9/32
See application file for complete search history.

(56) References Cited

U.S. PATENT DOCUMENTS 8,322,230 B2 * 12/2012 Weinstein ................. G01F 1/74
73/861.357

* cited by examiner

*Primary Examiner* — Erika J. Villaluna
(74) *Attorney, Agent, or Firm* — Matthew J Patterson (57) ABSTRACT

Methods and apparatus are disclosed utilizing a low-order parametric model for decoupling in conjunction with an optimization procedure to improve the ability to determine the density of the liquid phase of a bubbly mixtures within Coriolis meters by characterizing the effect of decoupling in the presence of bubble coalescence.

18 Claims, 11 Drawing Sheets

METHOD TO QUANTIFY THE EFFECTS OF DECOUPLING IN CORIOLIS METERS WITH BUBBLE COALESCENCE

CROSS REFERENCE TO RELATED APPLICATIONS

This application claims the benefit of U.S. Provisional Patent Application Ser. No. 63/166,473 having a filing date of 26 Mar. 2021. The disclosure of the application above is incorporated herein by reference in its entirety.

BACKGROUND OF THE DISCLOSURE

Field of the Disclosure

The present disclosure relates to determining the parameters related to apparatus and methods to quantify the effects of decoupling in Coriolis meters operating on bubbly flows.

Description of the Related Art

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. The references cited and discussed in this specification are incorporated herein by reference in their entireties and to the same extent as if each reference was individually incorporated by reference.

SUMMARY OF THE INVENTION

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method of operating a Coriolis meter having a process fluid that may include a bubbly mixture flowing therein measuring, at two or more instances of time, at least two of a first natural frequency of a process conveying flow tube, a second natural frequency of the process conveying flow tube, and a sound speed of the process fluid. The method also includes where, at the two or more instances of time, the density of the liquid phase of the bubbly mixture is substantially constant and the gas void fraction of the process fluid is substantially different, determining a density decoupling parameter at a plurality of different gas void fractions, where the said determined density decoupling parameter at the different gas void fractions are substantively different, and determining a model for the density decoupling parameter as a function of gas void fraction. Other embodiments of this aspect include corresponding computer systems, apparatus, and computer programs recorded on one or more computer storage devices, each configured to perform the actions of the methods.

Implementations may include one or more of the following features. The method of operating a Coriolis meter may include determining a density of the liquid phase of the process fluid. The model is in accordance with the following equation: $\rho_{meas} = (1 - \{k_d(\alpha)\}\alpha + G_d(f_{red})^2)\rho_{liq}$ where $\rho_{meas}$ is a reported density of the process fluid by a Coriolis calibrated to report the density of an essentially single phase fluid with low compressibility, $\{k_d(\alpha)\}$ is the density decoupling parameter as a function of the gas void fraction, $\alpha$ is the gas void fraction, $G_d$ is a density compressibility constant, $f_{red}$ is any of the first natural frequency of a process conveying flow tube and the second natural frequency of the process conveying flow tube and $\rho_{liq}$. The model may include a low-order parametric model for determining the density decoupling parameter. The low-order parametric model is in accordance with the following equation: $k_d = k_{d_{11}} + (k_{d_{max}} - k_{d_{11}})(1 - e^{-\beta\alpha})$ where $k_d$ is the density decoupling parameter, $\alpha$ is the gas void fraction, $k_{d_{11}}$, is the density decoupling parameter when $\alpha = 0$, $\beta$ is a fit parameter, and $k_{d_{max}}$ is the maximum value of the density decoupling parameter. Determining a model for the density decoupling parameter as a function of gas void fraction may include an optimization procedure. The optimization procedure includes an error function and where the determining a model for the density decoupling parameter as a function of gas void fraction and may include minimizing an error of measuring of any of the first natural frequency of a process conveying flow tube, the second natural frequency of the process conveying flow tube and the sound speed of the process fluid. Determining a model for the density decoupling parameter may include the density decoupling parameter varying with gas void fraction and where the density decoupling parameter approaches a fixed limit at high gas void fractions. The method includes where the bubbly mixture may include a plurality of bubbles, the fixed limit is $k_{d_{max}} = 3$, the density decoupling parameter may vary between 1 and 3, and where the plurality of bubbles are fully coupled to the liquid phase when the density decoupling parameter equals 1 and the plurality of bubbles are fully decoupled from the liquid phase when the density decoupling parameter equals 3. Determining a model for the density decoupling parameter in which the density decoupling parameter varies with gas void fraction and where the density decoupling parameter approaches a predetermined limit at high gas void fractions. Implementations of the described techniques may include hardware, a method or process, or computer software on a computer-accessible medium.

One general aspect includes an improved Coriolis meter having a process fluid that may include a bubbly mixture flowing therein where the improved Coriolis meter is configured to measure, at two or more instances of time, at least two of a first natural frequency of a process conveying flow tube, a second natural frequency of the process conveying flow tube, and a sound speed of the process fluid. The meter also includes where, at the two or more instances of time, the density of the liquid phase of the bubbly mixture is substantially constant and the gas void fraction of the process fluid is substantially different, a processor configured to determine a density decoupling parameter at a plurality of different gas void fractions, and a model configured to determine the density decoupling parameter as a function of gas void fraction. Other embodiments of this aspect include corresponding computer systems, apparatus, and computer programs recorded on one or more computer storage devices, each configured to perform the actions of the methods.

Implementations may include one or more of the following features. The improved Coriolis meter may include the processor configured to determine a density of the liquid phase of the process fluid. The model is in accordance with the following equation: $\rho_{meas} = (1 - \{k_d(\alpha)\}\alpha + G_d(f_{red})^2)\rho_{liq}$ where $\rho_{meas}$ is a reported density of the process fluid from a Coriolis meter calibrated to report the density of a process fluid that is essentially homogenous and has low compressibility, $\{k_d(\alpha)\}$ is the density decoupling parameter as a function of the gas void fraction, $\alpha$ is the gas void fraction, $G_d$ is a density compressibility constant, $f_{red}$ is any of the first natural frequency of a process conveying flow tube and the second natural frequency of the process conveying flow tube and $\rho_{liq}$ is the density of the liquid phase of the bubbly mixture. The model may include a low-order parametric model configured to determine the density decoupling parameter. The low-order parametric model is in accordance with the following equation: $k_d = k_{d11} + (k_{dmax} - k_{d11})(1 - e^{-\beta\alpha})$ where $k_d$ is the density decoupling parameter, $\alpha$ is the gas void fraction, $k_{d_{11}}$ is the density decoupling parameter when $\alpha = 0$ and $\beta$ is a fit parameter, $k_{dmax}$ is the maximum value of the density decoupling parameter. The model is configured to determine the density decoupling parameter as a function of gas void fraction may include an optimization procedure. The optimization procedure includes an error function and where the model configured to determine the density decoupling parameter as a function of gas void fraction is configured to minimize an error of measuring of any of the first natural frequency of a process conveying flow tube, the second natural frequency of the process conveying flow tube and the sound speed of the process fluid. The model is configured to determine the density decoupling parameter that may include the density decoupling parameter varying with gas void fraction and where the density decoupling parameter approaches a fixed limit at high gas void fractions. The improved Coriolis meter where the bubbly mixture may include a plurality of bubbles, the fixed limit is $k_{dmax} = 3$, the density decoupling parameter varies between 1 and 3, and where the plurality of bubbles are fully coupled to the liquid phase when the density decoupling parameter equals 1 and the plurality of bubbles are fully decoupled from the liquid phase when the density decoupling parameter equals 3. The model is configured to determine the density decoupling parameter the density decoupling parameter varying with gas void fraction and where the density decoupling parameter approaches a predetermined limit at high gas void fractions. Implementations of the described techniques may include hardware, a method or process, or computer software on a computer-accessible medium.

BRIEF DESCRIPTION OF THE DRAWINGS

So that the manner in which the above-recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following detailed description of the embodiments, reference is made to the accompanying drawings, which form a part hereof, and within which are shown by way of illustration specific embodiments by which the examples described herein may be practiced. It is to be understood that other embodiments may be utilized and structural changes may be made without departing from the scope of the disclosure.

Quantifying the effects of decoupling in Coriolis meters operating on multiphase flows can be critical to enabling Coriolis meters to accurately characterize parameters of multiphase flows, including but not limited to liquid phase density. It should be noted that for purposes of this disclosure that a Coriolis meter is defined using the prior art understanding, namely a device that utilizes an interpretation of the vibrational characteristics of a vibrating flow tube conveying a process fluid to determine either the mass flow or the density of said process fluid.

This disclosure presents methods to quantify and mitigate measurement errors that develop in Coriolis meters operating on bubbly flows. Quantifying the effect of bubbly flows as described herein requires the ability to determine at least the gas void fraction of the bubbly mixture. This disclosure presents embodiments that provide a means to determine the gas void fraction as part of the methodologies which essentially concurrently determine both the decoupling characteristics as well as determine measurement characteristics of the bubbly flows, which may include liquid density, and gas void fraction.

Decoupling is said to occur when components of a multiphase mixture being conveyed within a transversely vibrating flow tube, vibrate at different amplitudes. These components are often particles or bubbles conveyed by a continuous phase liquid. The amount of decoupling that occurs is a function of a several variables. For liquid continuous flows with particles (or bubbles), the ratio of amplitudes of vibration of the particles (or bubbles) to the continuous liquid has been shown to be a function of the inverse Stokes number and the density ratio of the continuous phase fluid to the density of the particles The inverse Stokes number is defined as:

$$\delta \equiv \sqrt{\frac{2\nu}{(2\pi f)R_{bubble}^2}} \qquad \text{(Equation 1)}$$

Where $\nu$ is the kinematic viscosity of the continuous phase of the bubbly mixture, f is the cyclical frequency of oscillation, and $R_{bubble}$ is a length scale that is representative of the radius of the bubble or bubbles. For example, for flows with a range of bubble sizes, $R_{bubble}$ could represent the mean bubble size.

For gas bubbles, in the limit of small inverse Stokes number, analytical models predict that the ratio of the amplitude of vibration of a bubble to the amplitude ratio of the continuous liquid phase approaches 3, and the gas bubbles are said to be fully-decoupled. In the limit of large inverse Stokes number, the bubble becomes fully-coupled to the liquid phase and amplitude ratio approaches 1.

Figure 1:
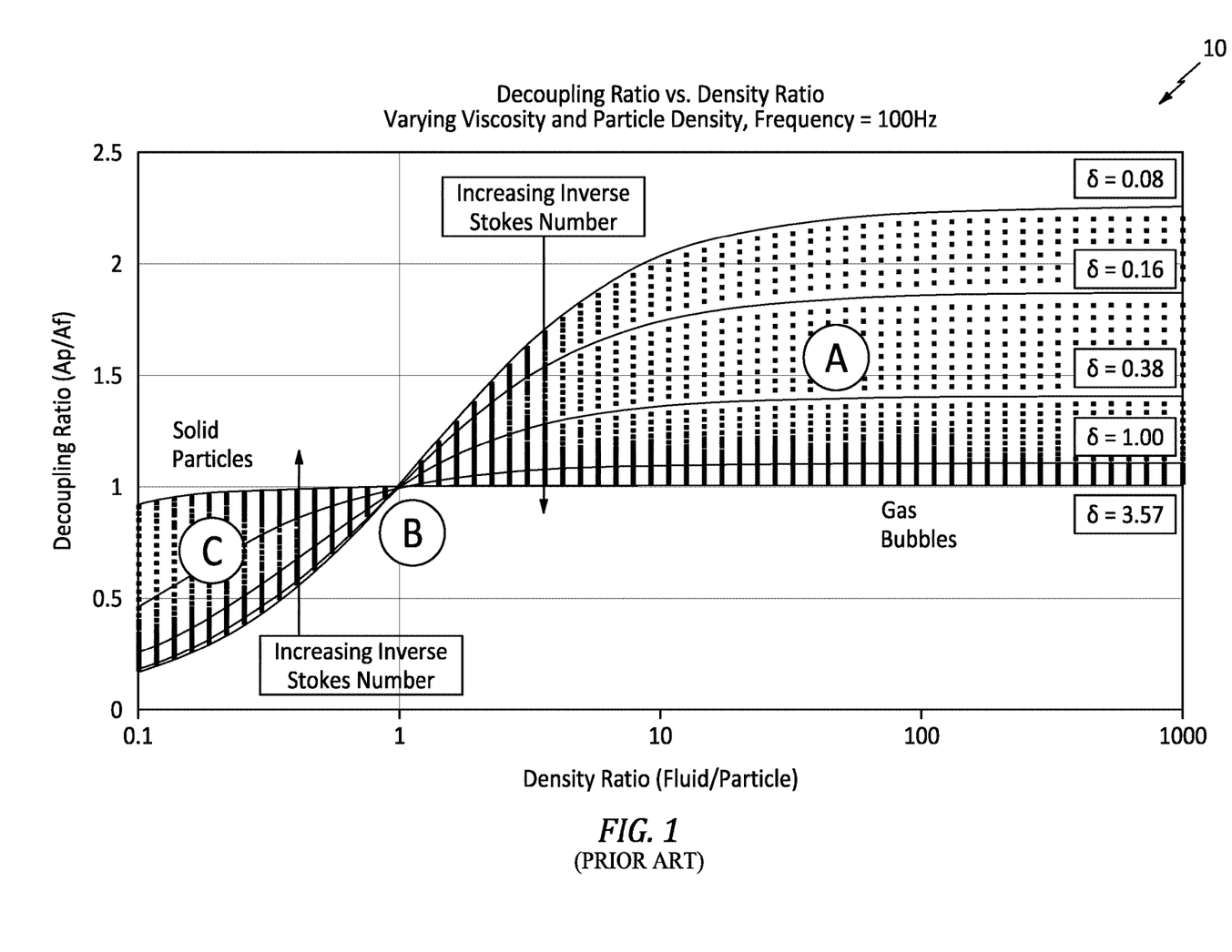
FIG. 1 is a graphical representation of the results of the decoupling amplitude ratio as a function of density ratio for a range of inverse Stokes numbers of the prior art.

Referring to FIG. 1, there is shown a graphical representation 10 of the results of analytical model for the decoupling amplitude ratio as a function of density ratio for a range of inverse Stokes numbers. Note that for bubbly flows, the density ratio is defined as the continuous phase (i.e. the liquid) density divided by particle (i.e. the gas) density For many applications of bubbly fluids, this ratio is on order of 10 to 1000, depending on the pressure of the application.

Decoupling of the two phases of an inhomogeneous multiphase mixture affects the relationship between the mass flow and density, (as reported by a Coriolis meter calibrated to operate on nearly incompressible, homogeneous flows) and the actual mass flow and density of an often more-compressible, inhomogeneous multiphase flow. Following a formulation developed by Hemp, this relationship can be characterized as follows:

$$\rho_{meas} = \left(1 - k_d\alpha + G_d(f_{red})^2\right)\rho_{liq} \text{ for density} \qquad \text{(Equation 2)}$$

and $$\dot{m}_{meas} = \left(1 - \frac{(k_m - 1)}{1 - \alpha}\alpha + G_m(f_{red})^2\right)\dot{m}_{mix} \text{ for mass flow} \qquad \text{(Equation 3)}$$

Where $\alpha$ is the gas void fraction, $k_d$ and $k_m$ are, as defined herein, the density decoupling parameter and the mass flow decoupling parameter respectively and may be constants or complex functions of other multiphase flow parameters.

It should be appreciated that $f_{red}$ is the reduced natural frequency of the vibration within the Coriolis flow tube and involves the vibration frequency, the diameter of the flow tube and the speed of sound of the process fluid and is defined as follows:

$$f_{red} \equiv \frac{2\pi f_{tube}D/2}{a_{mix}} \qquad \text{(Equation 4)}$$

The density decoupling parameter as defined herein can be used to correct for the effects of various amounts of decoupling on the measured density measurement of a Coriolis meter as defined in Equations 2, 3 and to report a corrected process fluid density of the process fluid.

Wherein $k_d$ and $k_m$ are the density decoupling parameter and the mass flow decoupling parameter respectively. Based on theoretical models, these parameters are bounded within the range of $1>k_d>k_{dmax}$ and $1>k_m>k_{mmax}$. Hemp suggests that $k_{dmax}=3$ and $k_{mmax}=3$. The specific value of the density decoupling parameter at any given operating condition is known to depend at least on the inverse Stokes number. In this formulation, the density compressibility parameter and mass flow compressibility parameter, $G_d$ and $G_m$ (respectively), determine the compressibility effects and can be determined empirically in general, but in this disclosure are assumed, as suggested by Hemp, to be constants with $G_d=0.25$ and $G_m=0.50$. Note that the density decoupling parameter and the mass flow decoupling parameter can often be assumed to be related through an empirical or analytical model, such that knowing or determining one, determines the other.

It should be appreciated by those skilled in the art that the density decoupling parameter is reflective of the ratio of the amplitude of vibration of the particle, or bubble, to amplitude of the vibration of the continuous phase (for bubbly flows, the liquid phase) in an inhomogeneous fluid undergoing transverse vibration. As indicated in FIG. 1, the density decoupling parameter for a given set of conditions is a function of bubble size. For a bubbly mixture vibrating within a flow tube of a given density ratio, a given fluid viscosity, and at a given frequency, the amount of decoupling increases with increasing bubble size.

Bubble size, however, is typically unknown and can be highly variable. Bubble size within a bubbly liquid can depend on many factors, including flow velocity and surface tension effects and other factors. Directly calculating or measuring bubble size for a standard process measurement is likely either impractical or cost prohibitive for most applications. The processing of determining bubble size is often further confounded by bubble coalescence. Bubbles, once formed as smaller bubbles, can also coalesce to form fewer but larger bubbles. Although bubble size is an important parameter governing the behavior of bubbly fluid within Coriolis meters, the methodologies presented in this disclosure do not require any direct measurement of knowledge of the bubble size. Rather, once the decoupling characteristics have been determined, parameters indicative of bubble size could be inferred.

Given the complexity of bubbly flows, it is reasonable to expect that the more bubbles of a given size that are present in a given volume of fluid, the more likely it is for the bubble to coalesce. For a Coriolis meters operating on bubbly mixtures with varying gas void fractions, this bubble coalescence mechanism can manifest itself as an increase in the effective bubble size with increasing gas void fraction, and, for bubbly flows that are not already fully decoupled, this can results in an increase in the effective density decoupling parameter, with increasing gas void fraction.

Often, the density of the liquid phase is a desired measurement parameter. For example, the density measurement from a Coriolis meter is often used to determine the watercut, defined as the ratio of water in an oil and water mixture, of an oil, water and gas mixture. In the limit of gas void fraction approaching zero, the density measurement from the Coriolis meter can be often used directly to accurately determine a density-based watercut measurement. However, if entrained gases are present (i.e. the gas void fraction is non-zero), the Coriolis density measurement is no longer directly representative of the liquid density and, depending on the amount of entrained gas (i.e. gas void fraction) and the amount of decoupling, the presence of the entrained gas can lead to significant errors in the interpreted density of the liquid phase. What is need in this, and similar applications, is a method to determine the density of the liquid phase, utilizing data measured from the bubbly liquids, independent of the gas void fraction of the bubbly liquid at the conditions of the process fluid density measurement. The methodology described herein enables accurate determination of the liquid phase density utilizing data from the bubbly liquid mixtures, independent of the gas void fractions of the bubbly mixture when the density measurements were performed.

Methods described in the prior art are not well suited for conditions for which the density decoupling parameter varies with gas void fraction, and for which Coriolis density measurements are only available for the bubbly mixture at significant gas void fractions.

What is needed is a methodology that can accurately determine the density of the liquid phase of bubbly mixture flowing through a Coriolis meter which exhibits an increasing density decoupling parameter with increasing gas void fraction utilizing data from conditions with variable and significant gas void fractions. Determining the liquid phase density of a bubbly mixture relies on modelling the effects of decoupling on the measured density of the bubbly mixture to effectively extrapolate the corrected mixture density back to a zero gas void fraction condition. Therefore, the larger the gas void fraction of the bubbly mixture with the lowest gas void fraction for which measured Coriolis density data is available, the more important it is to accurately model the behavior of the density decoupling parameter over a range of gas void fractions to provide an accurate determination of the liquid density.

Disclosed herein is a novel methodology which utilizes a low-order parametric model for the density decoupling parameter in conjunction with an optimization procedure which improves the ability to determine the density of the liquid phase of a bubbly mixtures within Coriolis meters by characterizing the effect of decoupling in the presence of bubble coalescence.

One model that attempts the capture these effects can be expressed as follows:

$$\rho_{meas}=(1-\{k_d(\alpha)\}\alpha+G_d(f_{red})^2)\rho_{liq} \text{ for density} \quad \text{(Equation 5)}$$

Where $\rho_{meas}$ is the reported density of the process fluid (reported by the uncorrected Coriolis meter), $\{k_d(\alpha)\}$ is the density decoupling parameter is a function of the gas void fraction $\alpha$, and is expressed using the same mathematical vernacular as f(x) where f is a function of x.

To model the effects of bubble coalescence, it would be desirable to have a model which allows the density decoupling parameter $k_d$ to be essentially constant for low gas void fractions for conditions for which significant bubble coalescence is unlikely to occur and for the density decoupling parameter to increase, with increasing gas void fractions, accounting for increasing bubble size due to an increasing amount of bubble coalescence. It is also desirable for the model for the density decoupling parameter to asymptotically approach a value indicative of a fully-decoupled bubbly mixture, associated with bubble size approaching a minimum size for which the bubbly fluid becomes essentially fully-decoupled. At these conditions, additional bubble coalescence would, while resulting in increased bubble size, would not increase the density decoupling parameter.

It may be useful to view the effects of bubble coalescence on the decoupling characteristics of a bubbly fluid within a vibrating flow tube as having three regimes. In the first regime, the gas void fraction is sufficiently low such that little bubble coalescence occurs for said bubbly mixture and the density decoupling parameter is not significantly influenced by changes in gas void fraction. In this first regime, the density decoupling parameter could range from values associated with fully-coupled to fully-decoupled behavior, depending on the characteristics, for example, the inverse Stokes number, of the vibrating bubbly flow.

A second regime, in which an increase in gas void fraction does result in in increased bubble coalescence and in increase in bubble size, and, provided that the bubble size is not sufficiently large such that the bubbly flow already fully-decoupled, this increase in bubble size results in an increase in the density decoupling parameter with increasing gas void fraction.

And a third regime, in which additional bubble coalescence may occur with increasing gas void fraction, however the bubble size in this region is already sufficiently large that the bubbly flow behaves as a fully-decoupled bubbly flow, and as such, the bubbly flow does not exhibit any increase in the density decoupling parameter with increasing gas void fraction.

This disclosure provides a methodology to identify the density decoupling parameters of bubbly flows with behaviors that may or may not span all three of the regimes described above. The ability of the methodology presented in this disclosure to address bubbly flows in regime 2, where the density decoupling parameter changes with gas void fraction, represents an advance in the state of the art.

In this disclosure, the term significant errors in interpreted liquid density is application specific, and is based on the desired accuracy of the process fluid measurement. For example, if the objective of a liquid phase density measurement was an accuracy of 1% accuracy in watercut, any error in interpreted liquid phase density associated with changes in the density decoupling parameter that results in errors on this order would be considered significant.

One example of a low-order parametric model for the density decoupling parameter of bubbly fluid operating in any or all of the three of the regimes described above is given below:

$$k_d=k_{d_{11}}+(3-k_{d_{11}})(1-e^{-\beta\alpha}) \quad \text{(Equation 6)}$$

Where Equation 6 is the functional form for determining $k_d$, $\beta$ is a fit parameter, and $k_{d_{11}}$ is the density decoupling parameter in the limit as gas void fraction approaches zero. In the limit of $\beta\alpha$ going to zero, $k_d$ approaches $k_{d_{11}}$. In this model, $k_{d_{max}}=3$. For large values of $\beta\alpha$, $k_d$ approaches a fixed limit of 3, wherein, in this model, 3 is associated with full-decoupling. For this model, two parameters, $k_{d_{11}}$ and $\beta$ quantify the density decoupling parameter $k_d$ over a range of gas void fractions.

Figure 2:
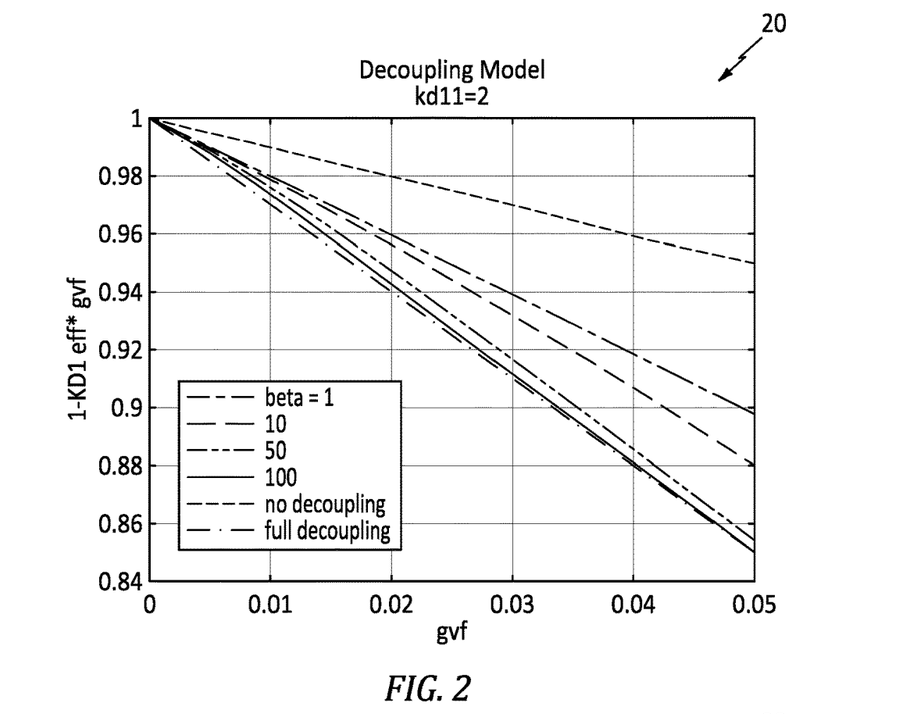
FIG. 2 is a graphical representation of the effect of decoupling versus gas void fraction in accordance with the present disclosure.

Referring to FIG. 2, there is shown a graphical representation 20 of the effect of decoupling versus gas void fraction for $k_{d_{11}}=2$ for a range of fit parameters β. As shown, as the gas void fraction approaches zero, the density decoupling parameter approaches $k_d \rightarrow k_{d_{11}}=2$, and the density decoupling parameter approaches full-decoupling ($k_d \rightarrow k_{dmax}=3$) as the product of pa increases. It is noted that the formulation of this model for the density decoupling parameter is not unique. The primary characteristic of the model is that the density decoupling parameter can increase with increasing gas void fraction, but still remain bounded by a theoretical limit associated with an inviscid bubble, which in this formulation corresponds to a density decoupling parameter $k_d=3$. It should be appreciated by those skilled in the art that the model of the present disclosure for the density decoupling parameter is linear as the gas void fraction approaches zero.

For example, an alternate formation using the error (erf) function is given below:

$$k_d = k*_{d_{11}} + (3 - k_{d_{11}})\operatorname{erf}(\beta*\alpha) \quad \text{(Equation 7)}$$

Where erf function is defined as:

$$\operatorname{erf}(z) \equiv \frac{2}{\pi}\int_0^z e^{-t^2}dt.$$

The erf function ranges from 0 at z=0, and asymptotes to 1 at larger positive values of z.

Figure 3:
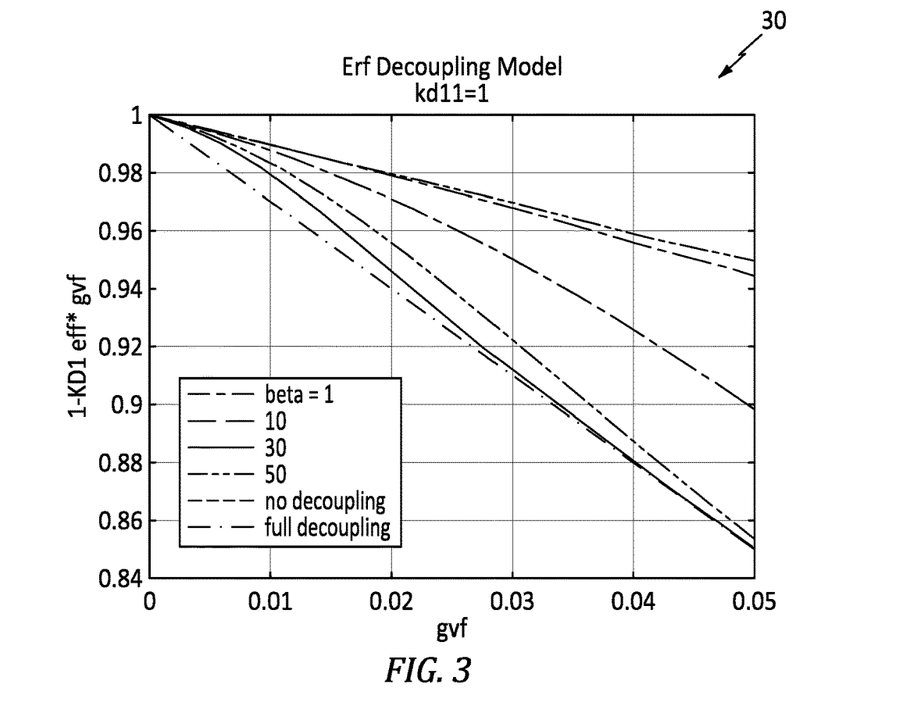
FIG. 3 is a graphical representation of the effect of decoupling versus gas void fraction using the erf function in accordance with the present disclosure.

The results of which are shown with reference to the graphical representation of FIG. 3 of the effect of decoupling versus gas void fraction using the erf function.

As an example only, the analysis presented in this disclosure utilizes the density decoupling parameter model described in Equation 6 and illustrated in FIG. 2 for a fixed value of $k_{d_{11}}$ for a range of β over a range of gas void fractions, although the disclosure is not so limited by the use of this example.

Figure 4:
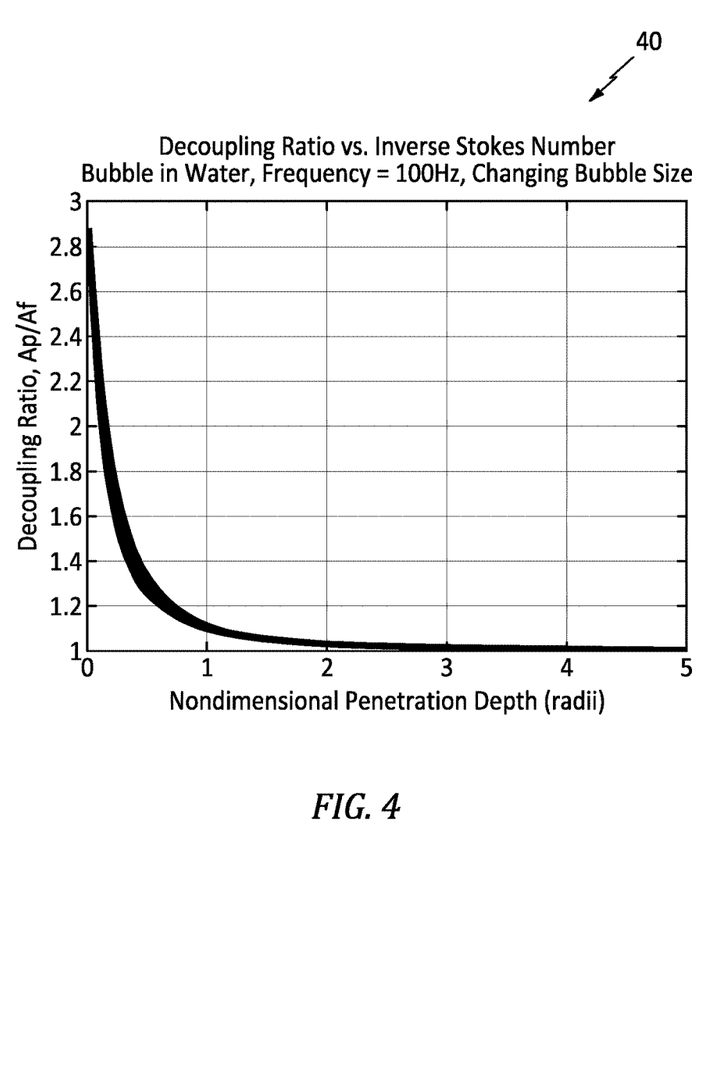
FIG. 4 is a graphical representation of the decoupling ratio as a function of the inverse Stokes number in accordance with the present disclosure.
Figure 5:
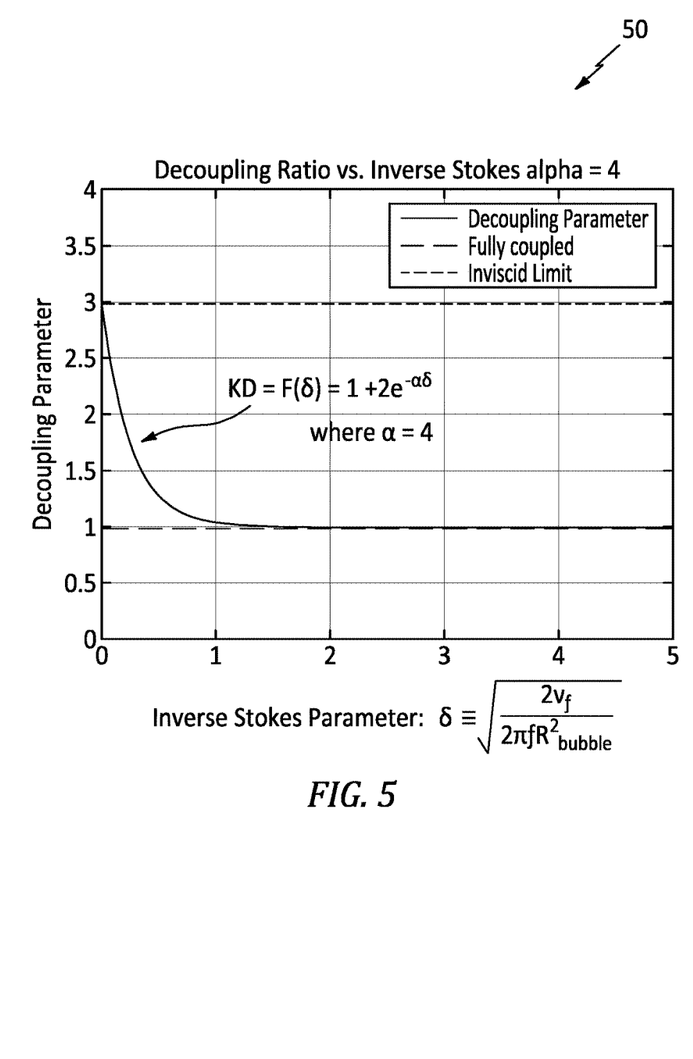
FIG. 5 is a graphical representation of the decoupling ratio as a function of the inverse Stokes number in accordance with the present disclosure.

It should be appreciated by those skilled in the art that the model disclosed herein for the density decoupling parameter of a single frequency Coriolis meter can be used to describe the density decoupling parameters for each of the vibrational modes of a dual or multiple frequency Coriolis meter. Referring next to FIG. 4 there is shown the decoupling ratio as a function of the inverse Stokes parameter 40 and, utilizing an assumption of equivalence between the decoupling amplitude ratio and the density decoupling parameter, FIG. 5 shows the density decoupling parameter $k_d$ as a function of the inverse Stokes number 50. This functional relationship of the density decoupling parameter and the inverse Stokes number is assumed to hold for bubbly mixtures over a range of frequencies, viscosities, and bubble sizes. Utilizing the model shown in FIG. 5, the density decoupling parameter exhibited by a multiphase fluid vibrating within a flow tube at one frequency can be related to the density decoupling parameter exhibited by the same multiphase fluid within the same flow tube vibrating at a second frequency, noting that, since the fluid viscosity and bubbly size associated with the oscillations at the two frequencies are the same, the inverse Stokes numbers for the two vibration modes only differ due to the different vibrational frequencies.

Utilizing the expression for the density decoupling parameter as a function of inverse Stoke number yields the following:

$$k_d = F(\delta) = 1 + 2e^{-\alpha\delta} = 1 + 2e^{-\alpha\sqrt{\frac{2v_{f1}}{2\pi f R_{bubble}^2}}} \quad \text{(Equation 7)}$$

The density decoupling parameter at one frequency can be related to the density decoupling parameter at a second frequency. Noting that the relationship between the inverse Stokes numbers and the vibrational frequencies is given by:

$$\frac{\delta_2}{\delta_1} = \sqrt{\frac{f_1}{f_2}} \quad \text{(Equation 8)}$$

The density decoupling parameter at the second frequency $k_{d2}$ can be expressed in terms the density decoupling parameter at the first frequency $k_{d1}$ and the frequency ratio of the vibrational modes as follows:

$$k_{d_2} = 2\left(\frac{k_{d_1}-1}{2}\right)^{\sqrt{\frac{f_1}{f_2}}} + 1 \quad \text{(Equation 9)}$$

It should be appreciated that, under these assumptions, defining the density decoupling parameter for a bubbly mixture vibrating within a fluid conveying flow tube at one frequency thus provides a model for the density decoupling parameter of the same fluid within the same tube vibrating at a different frequency.

Low order parametric models for the effects of decoupling for flows that may be exhibiting some amount of coalescence can be used in optimization procedures the quantify the effect of decoupling as will be disclosed in more detail herein after.

For example, the model disclosed immediately herein above can be used with speed of sound augmented Coriolis meters utilizing methods similar to those described in co-pending Patent Cooperation Treaty application titled "CORIOLIS METER APPARATUS AND METHODS FOR THE CHARACTERIZATION OF MULTIPHASE FLUIDS", having application number PCT/US21/18283, the disclosure of which is incorporated herein in its entirety, to characterize the effect of decoupling and compressibility on multiphase flows in which the density decoupling parameter changes with gas void fraction due to coalescence or other mechanisms.

Figure 6:
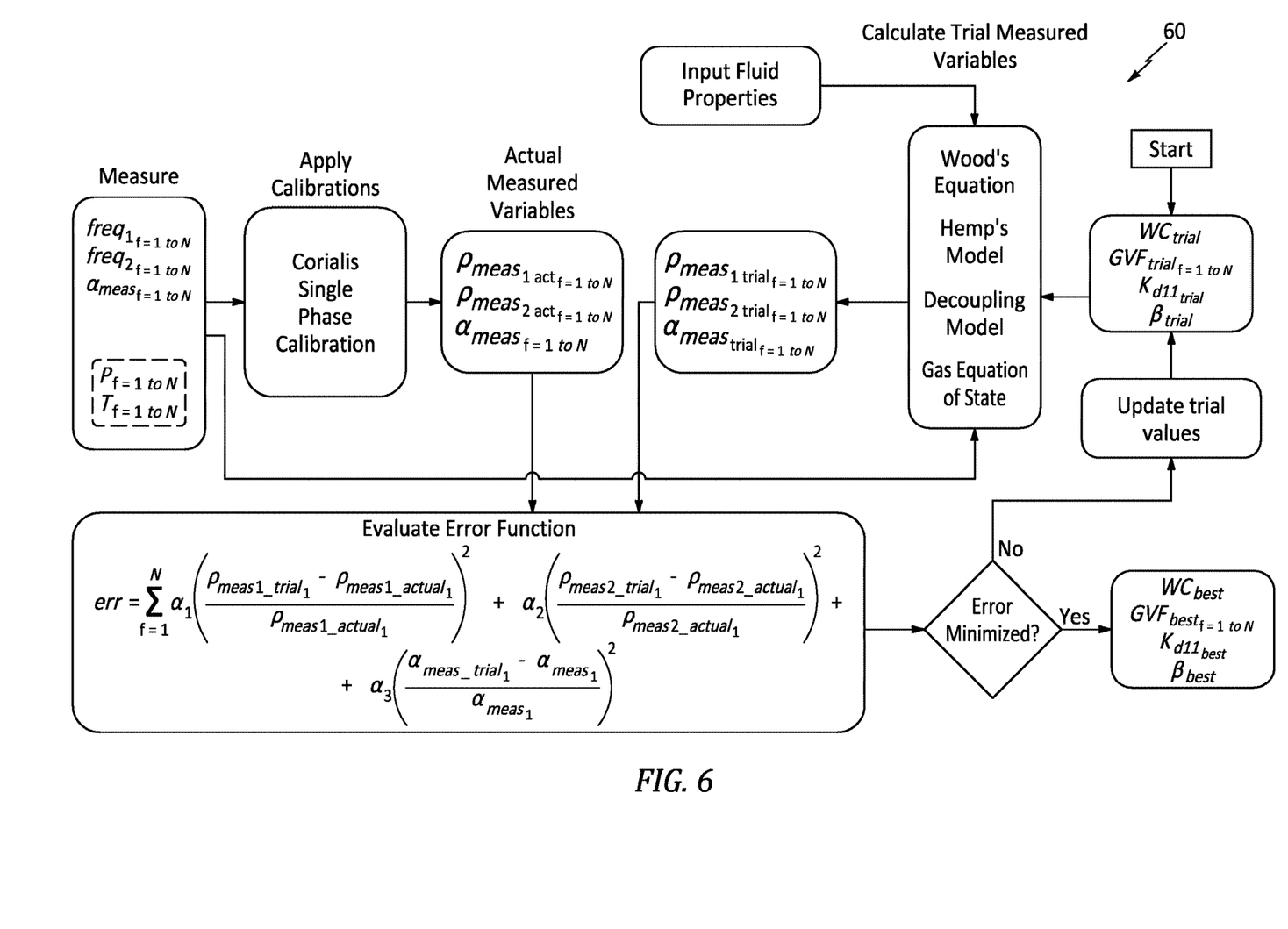
FIG. 6 is a flow chart of an algorithm to interpret the output of a Coriolis meter operating on a bubbly mixture in accordance with the present disclosure.

Referring to FIG. 6, there is shown a flow chart of an algorithm 60 to interpret the output of a Coriolis meter operating on a bubbly mixture. Specifically, this algorithm provides an improved determination of the density of the liquid phase and provides a means to quantify gas void fraction and density decoupling characteristics exhibited by the multiphase mixture within the Coriolis flow tubes. It should be appreciated by those skilled in the art that algorithm 60 can be comprised of software configured to be executed on a processor. The processor can be integrated with a Coriolis meter or can be separate therefrom. The algorithm 60 shown in the figure involves measuring at least two of the following parameters: 1) a first vibrational frequency of a fluid conveying flow tube; 2) a second vibration frequency of said flow tube; and 3) the speed of sound of the process fluid within said vibrational flow tube. Additionally, the algorithm involves measuring the parameters at two or more instance of time over which the liquid density (watercut used herein as proxy for liquid density), and the density decoupling parameters ($k_{d11}$ and $\beta$) are assumed constant over the two or more instances of time. Additionally, the compressibility constant ($G_d$) is also assumed known and constant in this analysis. It should be appreciated by those skilled in the art that algorithm 60 can be modified to solve for a compressibility constant as well by including it as an optimization parameter.

Simulation Approach

As described above, determining the gas void fraction of the bubble flow is an important part of the methodology described herein to accurate characterize bubbly flows. This disclosures provides examples of three embodiments that utilize different measurement variables to accurately characterize bubbly flows exhibiting bubble coalescence.

To demonstrate the utility of this approach, results of a simulation are disclosed in which the models developed herein and in the referenced documents were used to generate simulated measured data. This simulated measured data can then be utilized within algorithm 60 of the optimization process of FIG. 6 to calculate and optimize an error function to determine the multiphase flow characteristics and density decoupling parameters associated with the simulated measured data. The simulation generated simulated measured values of vibrational frequency of a first vibrational mode and a second vibrational mode of a fluid conveying flow tube of a Coriolis meter and a process fluid sound speed for a mixture with constant liquid and gas properties, but with varying gas void fractions.

The various FIGS. 7-13 are graphical representations of calculations using the simulated measured data. The parameters used in the simulations are listed in titles of FIGS. 7-13 and were selected the represent a typical three phase mixture of oil, water, and hydrocarbon gas operating at a nominal pressure of 200 psia with a Coriolis meter with 2 inch diameter tubes and a first vibration frequency of ~76 Hz, and a second vibration frequency of ~422 Hz. The sound speed and densities of the oil, water, and gas components were selected to be representative of a typical oil and gas application.

The optimization process of algorithm 60 was used to evaluate the effectiveness of three configurations that varied based on the simulated measurement data utilized to form the error function. The three configurations included: 1) a dual frequency Coriolis meter; 2) a single frequency Coriolis meter with a speed of sound measurement; and 3) a dual frequency Coriolis meter with a speed of sound measurement. Each of the three configurations was evaluated with 0.1% maximum random noise applied each simulated measured parameter. It is important to note that each of the three configurations was shown to be able to effectively characterize the density decoupling characteristics, the gas void fraction and the liquid density of the process fluid.

Dual Frequency Coriolis Meter Simulation

Figure 7:
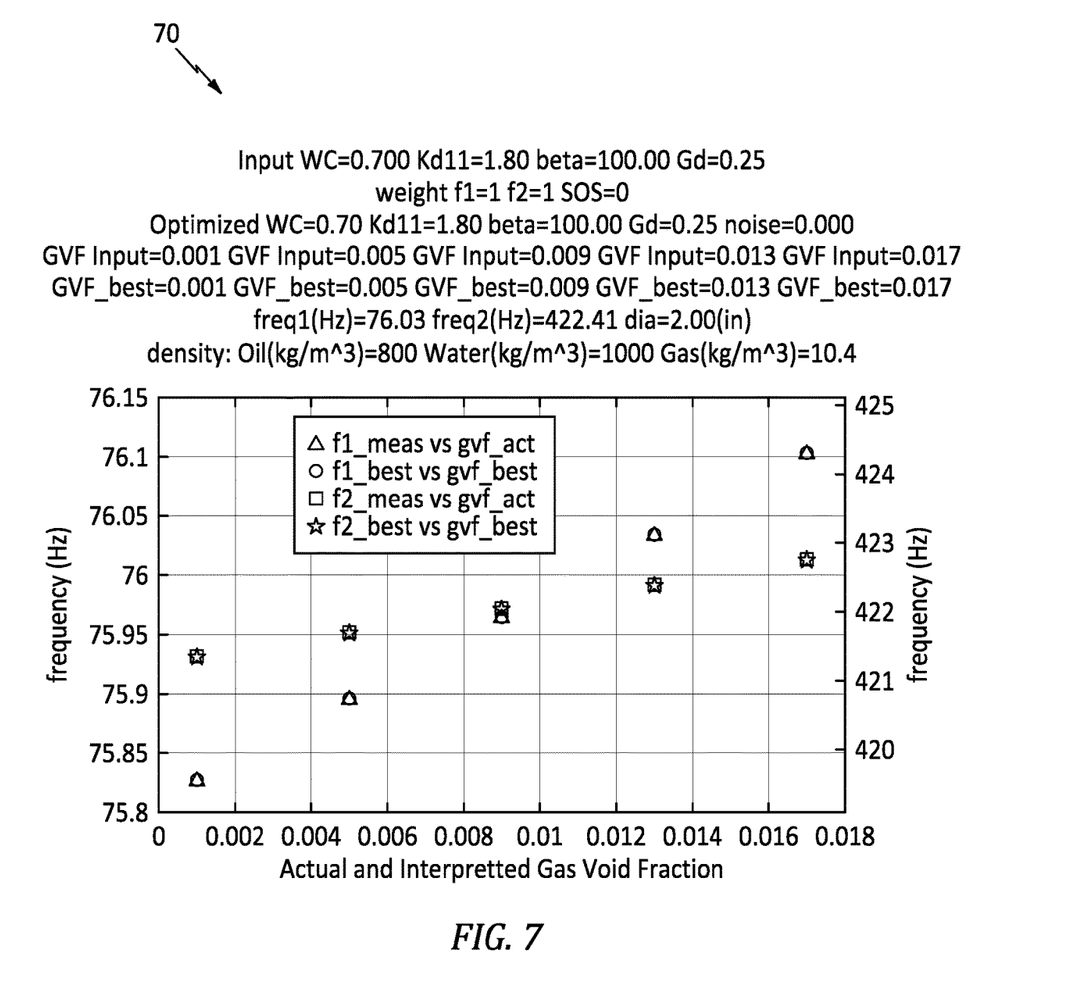
FIG. 7 is a graphical representation of simulated measured data and optimized frequencies for a first and a second vibrational frequency of a flow tube of a Coriolis meter conveying a multiphase fluid in accordance with the present disclosure.

Referring to FIG. 7, there is shown plot 70 of simulated measured data and optimized frequencies for a first and a second vibrational frequency of a flow tube of a Coriolis meter conveying a multiphase fluid at 5 gas different void fractions. As shown, the simulated measured and optimized natural frequencies of each vibrational mode of the fluid-conveying flow tubes of the Coriolis meter increase with increasing gas void fraction. The simulated measured frequencies are used within algorithm 60 of the optimization process to determine the optimized multiphase characteristics and decoupling parameters. Note that, utilizing only the two measured natural frequencies from the Coriolis meter at multiple simulated gas void fractions, the optimization process is able to determine the simulated density decoupling parameters and gas void fractions for each of the input gas void fraction conditions.

It should be appreciated by those skilled in the art that the speed of sound of long wavelengths (i.e., with wavelengths larger than the diameter of the fluid conveying flow tube), essentially one-dimensional, acoustic waves propagating within a flow tube conveying a bubbly mixture can be related to the gas void fraction of the bubbly mixture utilizing Wood's Equation, as disclosed in the above referenced co-pending PCT application number PCT/US21/18283. Wood's Equation was used in the simulation disclosed herein to determine the process fluid sound speed as a function of the input gas void fraction data to generate the simulation data used as input to the optimization process, and, even in scenarios in which the process fluid sound speed was not a measured parameter, Wood's Equation was utilized in the optimization process to relate the speed of sound and the gas void fraction.

Figure 8:
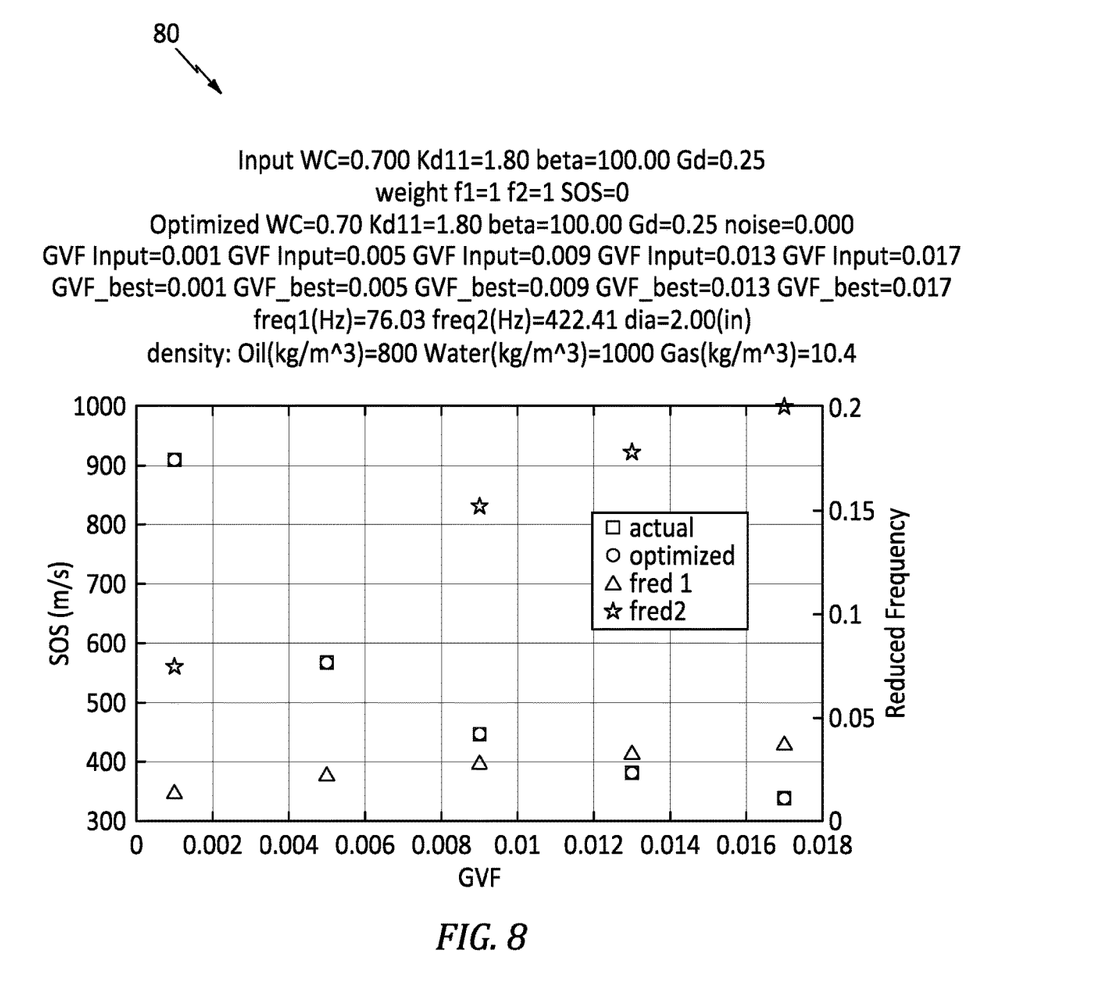
FIG. 8 is a graphical representation of simulated measured data and optimized process fluid sound speed and reduced frequencies for two vibrational modes for two vibrational modes for a Coriolis meter with a process fluid with constant liquid properties and decoupling parameters with varying gas void fraction in accordance with the present disclosure.

Referring next to FIG. 8, there is shown a plot 80 of simulated measured data and optimized process fluid sound speed and reduced frequencies for two vibrational modes for two vibrational modes for a Coriolis meter with a process fluid with constant liquid properties and decoupling parameters with varying gas void fraction. The process fluid sound speed decreases with increase gas void fraction, resulting in the reduced frequency of the two vibrational modes increasing with increasing gas void fraction.

Figure 9:
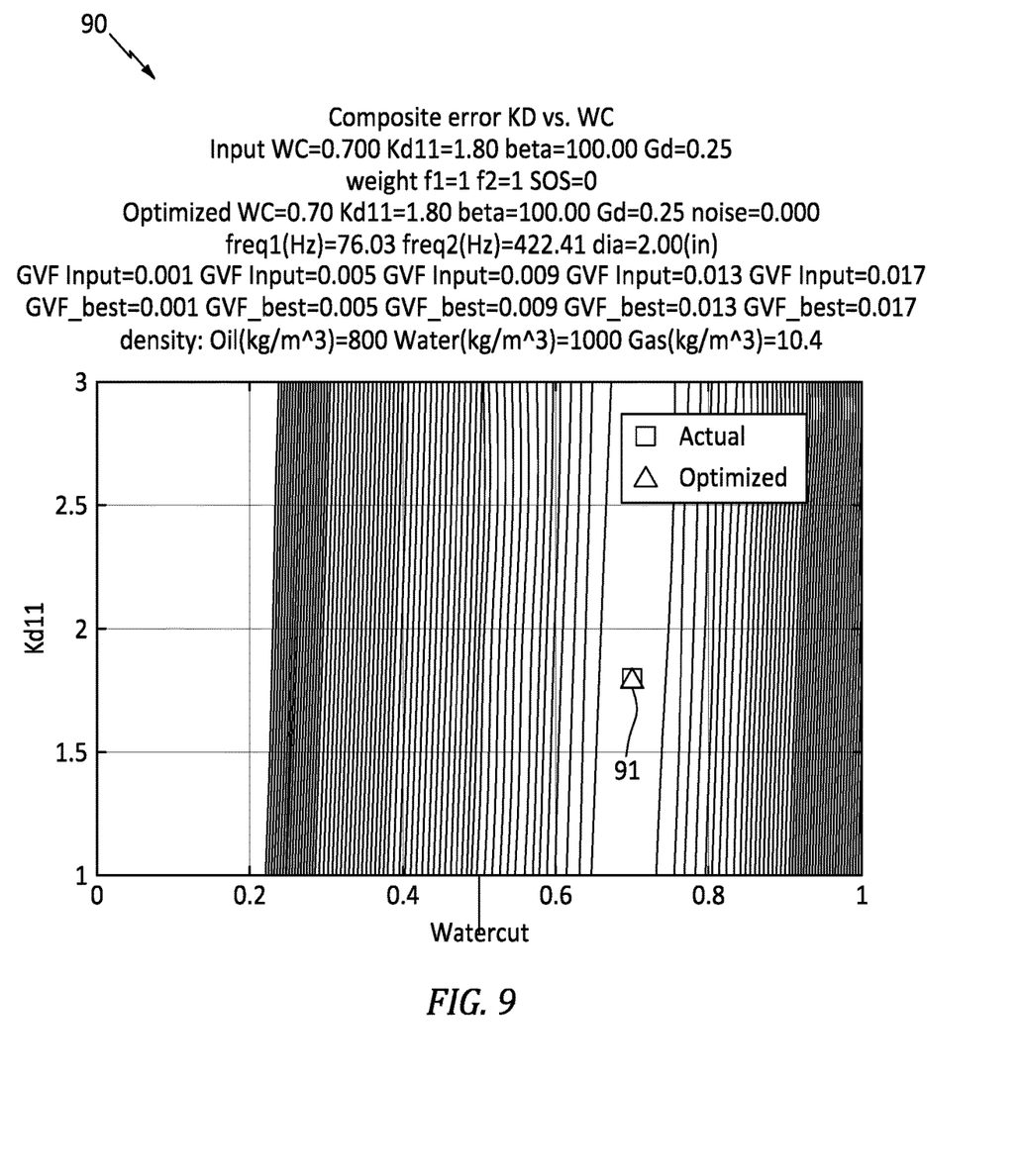
FIG. 9 is a graphical representation of the error function as a function of watercut and $K_{d11}$ in accordance with the present disclosure.
Figure 10:
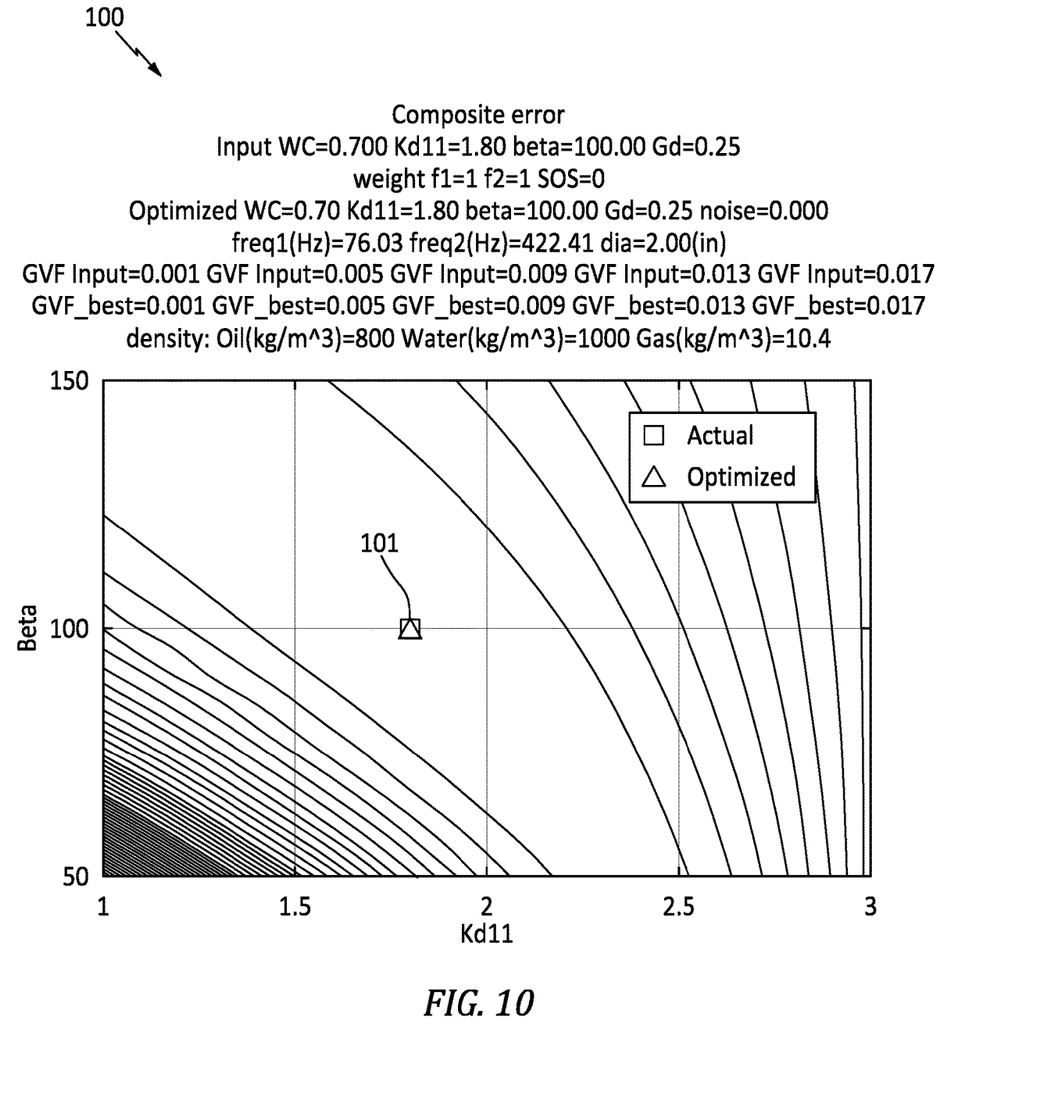
FIG. 10 is a graphical representation of the error function as a function of $\beta$ versus $K_{d11}$ in accordance with the present disclosure.

Now referring to FIG. 9, there is shown contour plots 90, 100 of error function projection onto two dimensions for the optimized solutions found utilizing the simulated measured frequencies for a first vibrational mode and a second vibrational mode of a Coriolis meter at 5 instances of gas void fraction for the same liquid properties with gas void fraction ranging from 0.1% to 1.7%. Plot 90 shows the error function as a function of watercut (used herein as a proxy for liquid density) and $K_{d11}$. Plot 100 shows the error function as a function of $\beta$ versus $k_{d11}$. As shown in the figures, in the absence of noise, the optimization process of FIG. 6 finds the input (or actual) parameters 91, 101.

Figure 11:
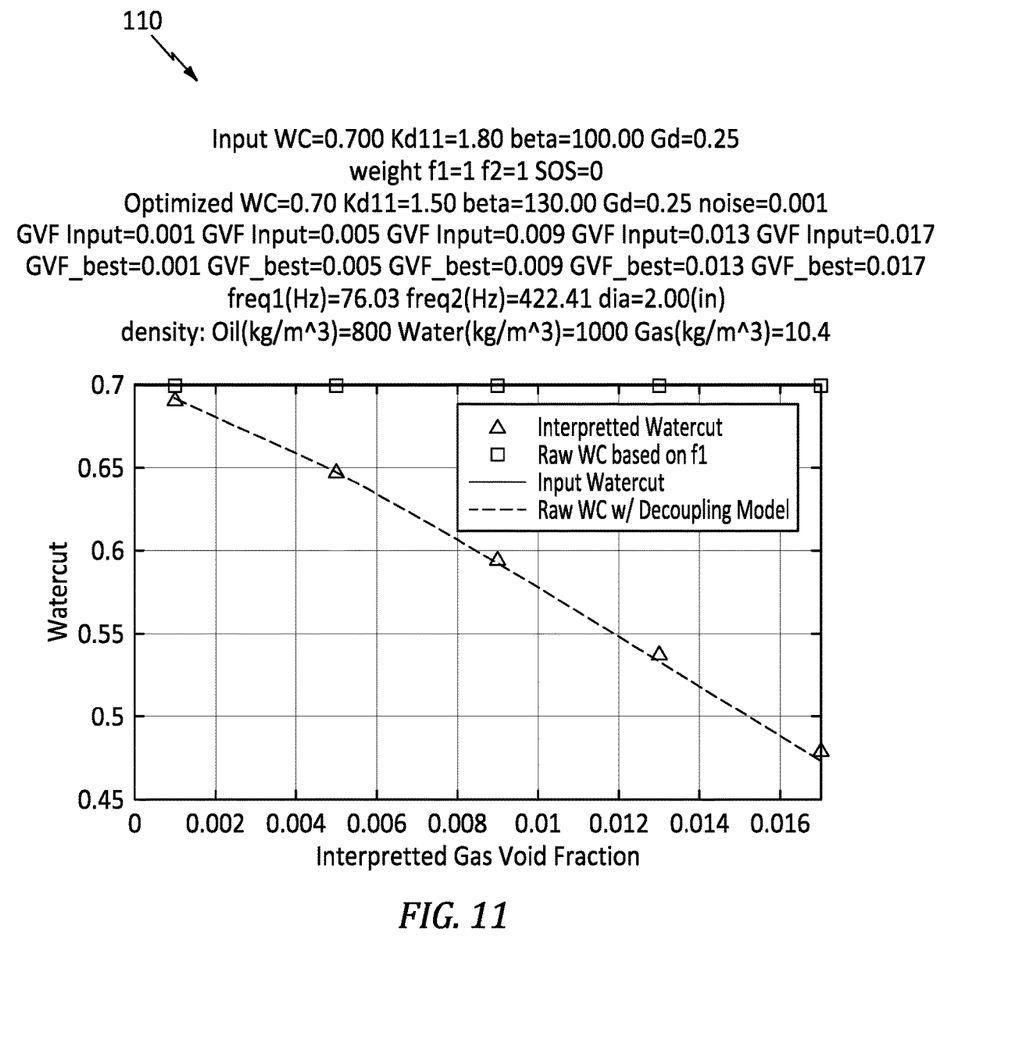
FIG. 11 is a graphical representation of an optimization process based on a simulation of the measured vibrational frequency at a first frequency and at a second frequency of a Coriolis meter in accordance with the present disclosure.

Referring next to FIG. 11, there is shown a graph 110 of the results of an optimization process based on a simulation of the measured vibrational frequency at a first frequency and at a second frequency of a Coriolis meter with 0.1% random noise added to the simulated measured values at 5 different gas void fractions for a multiphase mixture with constant watercut and decoupling parameters $\beta$ and $K_{d11}$ and constant compressibility parameter $G_d$. As shown by graph 110, the optimization process of FIG. 6 is able to accurately determine the watercut and gas void fraction for the multiphase flow. As with the optimization that utilized measurements of a single frequency and process fluid sound speed disclosed herein earlier, the added measurement noise did result in the optimized decoupling parameters, $\beta$ and $K_{d11}$, differing from the input values, but this did not have a significant effect of the optimized multiphase flow characteristics.

Single Frequency Density and SOS Coriolis Simulation

Figure 12:
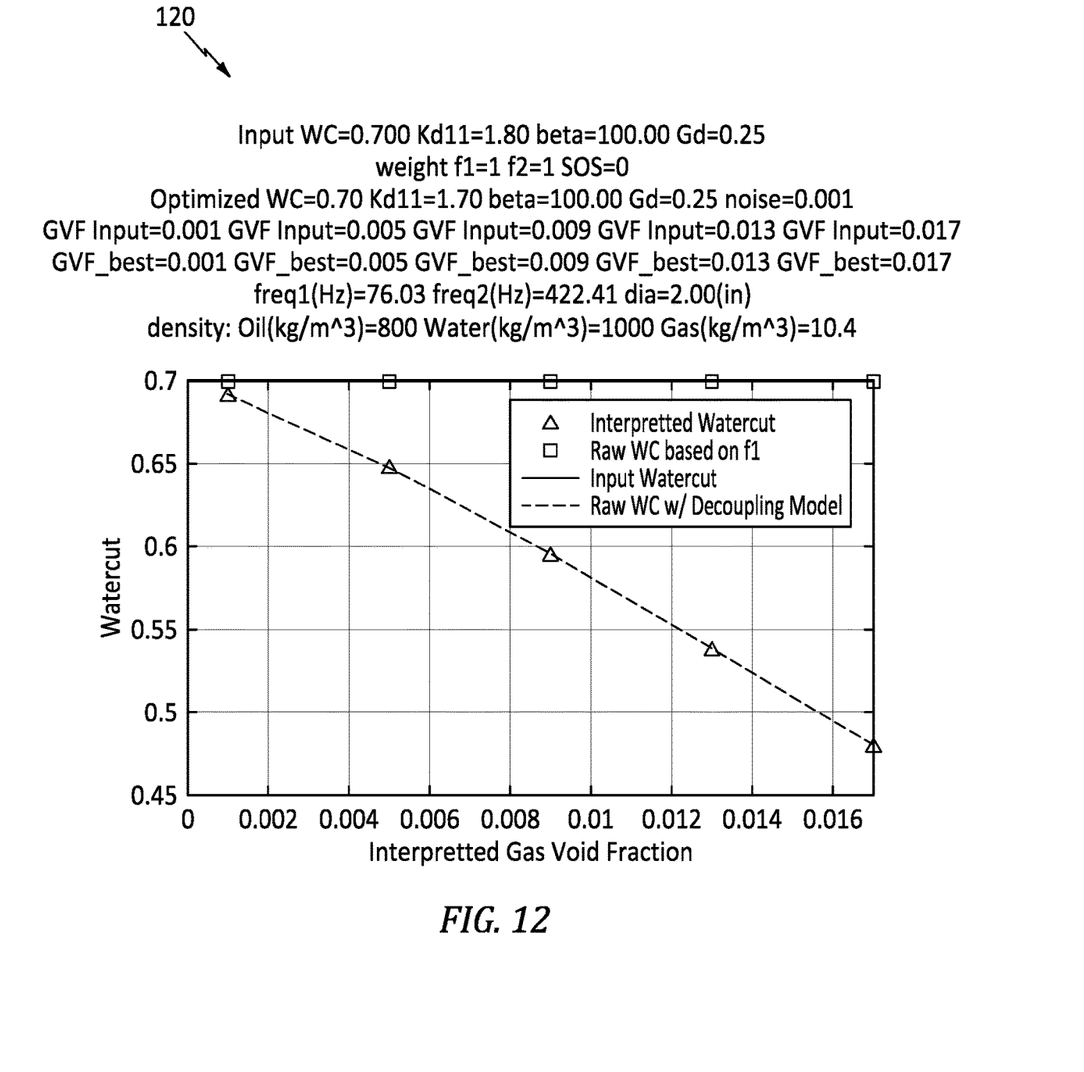
FIG. 12 is a graphical representation of an optimization process based on a simulation of the measured vibrational frequency at one frequency and a simulated measured speed of sound in accordance with the present disclosure.

Referring to FIG. 12, there is shown graph 120 of shows the results of an optimization based on a simulation of the measured vibrational frequency at one frequency and a simulated measured speed of sound with 0.1% random noise added to the simulated measured values at 5 different gas void fractions for a multiphase mixture with constant watercut and decoupling parameters $\beta$ and $K_{d11}$ and constant compressibility parameter $G_d$. As shown, the optimization procedure of FIG. 6 with added measurement noise accurately determined the watercut and gas void fraction of the multiphase fluid. The added measurement noise did result in the optimized decoupling parameters, $\beta$ and $K_{d11}$, differing from the input values, but this did not have a significant effect of the optimized multiphase flow characteristics.

Dual Frequency Coriolis Meter with Process Fluid Speed of Sound Simulation

Figure 13:
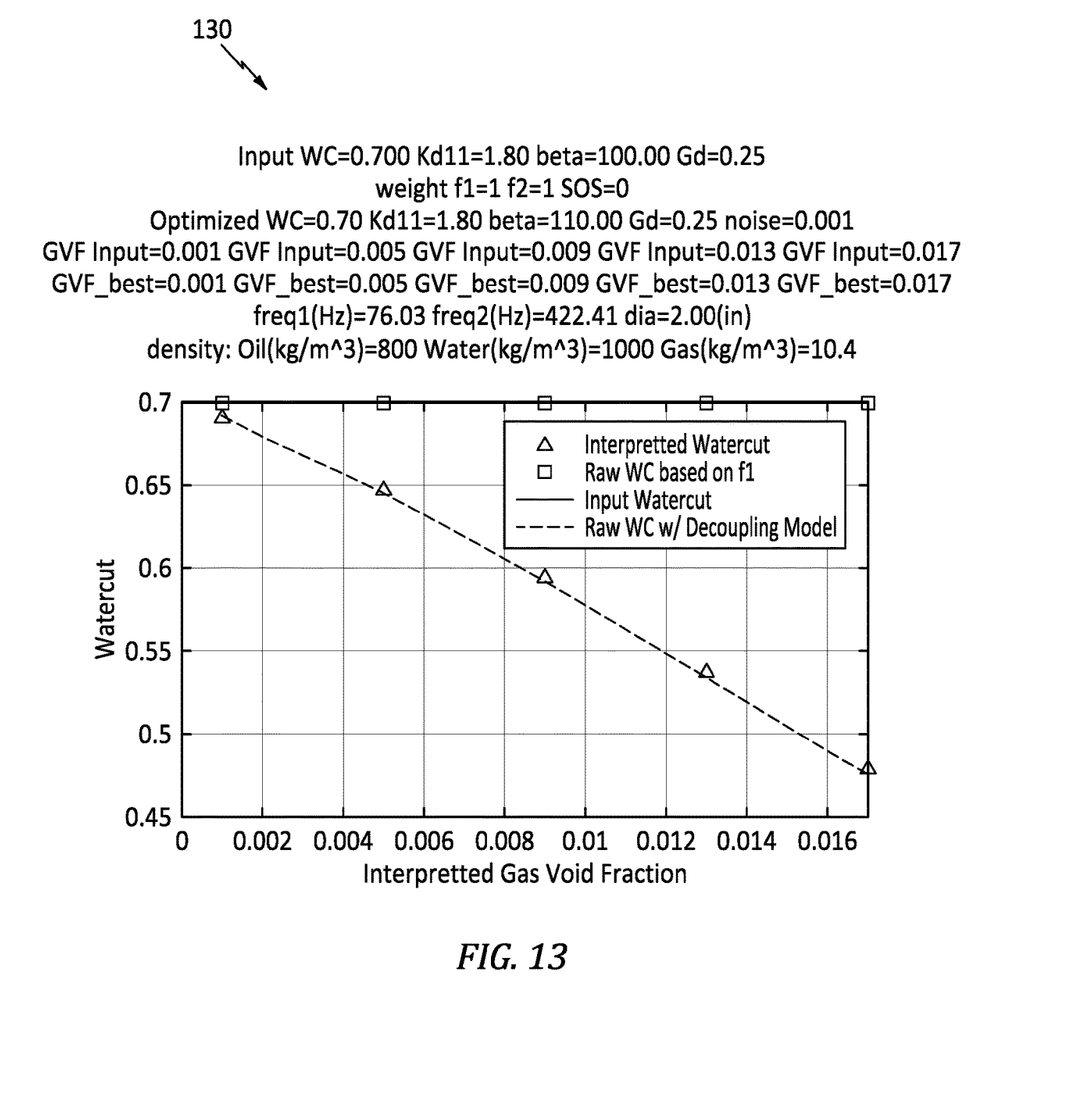
FIG. 13 is a graphical representation of an optimization process based on a simulation of the measured vibrational frequency at a first frequency, a second measured vibrational frequency, and a process fluid speed of sound measurement in accordance with the present disclosure.

Referring to FIG. 13, there is shown graph 130 of an optimization process of FIG. 6 based on a simulation of the measured vibrational frequency at a first frequency, a second measured vibrational frequency, and a process fluid speed of sound measurement with 0.1% random noise added to the simulated measured values at 5 different gas void fractions for a multiphase mixture with constant watercut and decoupling parameters $\beta$ and $K_{d11}$ and constant compressibility parameter $G_d$. As shown, the optimization process of FIG. 6 was able to accurately determine the watercut and gas void fraction for the multiphase flow. As with the optimization processed utilizing two of the three measurements, the added measurement noise did result in the optimized decoupling parameters, $\beta$ and $K_{d11}$, differing from the input values, but this did not have a significant effect of the optimized multiphase flow characteristics.

All of the methods disclosed and claimed herein can be made and executed without undue experimentation in light of the present disclosure. While the apparatus and methods of this disclosure have been described in terms of preferred embodiments, it will be apparent to those of skill in the art that variations may be applied to the methods and in the steps or in the sequence of steps of the method described herein without departing from the concept, spirit and scope of the disclosure. In addition, modifications may be made to the disclosed apparatus and components may be eliminated or substituted for the components described herein where the same or similar results would be achieved. All such similar substitutes and modifications apparent to those skilled in the art are deemed to be within the spirit, scope, and concept of the disclosure.

Although the methods and apparatus is/are described herein with reference to specific embodiments, various modifications and changes can be made without departing from the scope of the present invention(s), as presently set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated other The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations While the foregoing is directed to embodiments of the present disclosure, other and further embodiments of the disclosure may be devised without departing from the basic scope thereof, and the scope thereof is determined by the claims that follow.

What is claimed is:

1. A method of operating a Coriolis meter having a process fluid comprising a bubbly mixture flowing therein, the process fluid having a density of a liquid phase and a gas void fraction, the method comprising:
   measuring, at two or more instances of time, at least two parameters consisting of:
      a first natural frequency of a process conveying flow tube;
      a second natural frequency of the process conveying flow tube; and
      a sound speed of the process fluid;
   wherein, at the two or more instances of time, the density of the liquid phase of the bubbly mixture is substantially constant and the gas void fraction of the process fluid is substantially different;
   determining a density decoupling parameter at a plurality of different gas void fractions for which the density decoupling parameter determined for the at least two of the instances of time differ; and
   determining a model for the density decoupling parameter as a function of gas void fraction.

2. The method of operating a Coriolis meter of claim 1 further comprising determining a density of the liquid phase of the process fluid.

3. The method of operating a Coriolis meter of claim 2 wherein the model is in accordance with the following:

$$\rho_{meas}=(1-\{k_d(\alpha)\}\alpha+G_d(f_{red})^2)\rho_{liq}$$

where $\rho_{meas}$ is a reported density of the process fluid, $\{k_d(\alpha)\}$ is the density decoupling parameter as a function of the gas void fraction, $\alpha$ is the gas void fraction, $G_d$ is a density compressibility constant, $f_{red}$ is any of the first natural frequency of a process conveying flow tube and the second natural frequency of the process conveying flow tube and $\rho_{liq}$ is the density of the liquid phase of the process fluid.

4. The method of operating a Coriolis meter of claim 2 wherein the model comprises a low-order parametric model for determining the density decoupling parameter.

5. The method of operating a Coriolis meter of claim 4 wherein the low-order parametric model is in accordance with the following:

$$k_d=k_{d11}(k_{dmax}-k_{d11})(1-e^{-\beta\alpha})$$

where $k_d$ is the density decoupling parameter, $\alpha$ is the gas void fraction, $k_{d11}$ is the density decoupling parameter when $\alpha=0$, $\beta$ is a fit parameter, and $k_{dmax}$ is the maximum value of the density decoupling parameter.

6. The method of operating a Coriolis meter of claim 1 wherein determining a model for the density decoupling parameter as a function of gas void fraction comprises an optimization procedure.

7. The method of operating a Coriolis meter of claim 6 wherein the optimization procedure includes an error function and wherein the determining a model for the density decoupling parameter, wherein the density decoupling parameter which varies as a function of gas void fraction, the optimization procedure comprises minimizing an error of the at least two parameters and determining the gas void fractions from the at least two parameters.

8. The method of operating a Coriolis meter of claim 1 wherein determining a model for the density decoupling parameter comprises wherein the density decoupling parameter varies with gas void fraction.

9. The method of operating a Coriolis meter of claim 8 wherein:
the bubbly mixture comprises a plurality of bubbles;
the density decoupling parameter includes a fixed limit of $k_{dmax}=3$;
the density decoupling parameter varies between 1 and 3; and
wherein the plurality of bubbles are fully coupled to the liquid phase when the density decoupling parameter equals 1 and the plurality of bubbles are fully decoupled from the liquid phase when the density decoupling parameter equals 3.

10. An improved Coriolis meter having a process fluid comprising a bubbly mixture flowing therein, the process fluid having a density of a liquid phase and a gas void fraction, the improved Coriolis meter comprising:
the improved Coriolis meter configured to measure, at two or more instances of time, at least two of:
a first natural frequency of a process conveying flow tube;
a second natural frequency of the process conveying flow tube; and
a sound speed of the process fluid;
wherein, at the two or more instances of time, the density of the liquid phase of the bubbly mixture is substantially constant and the gas void fraction of the process fluid is substantially different;
a processor configured to determine a density decoupling parameter at a plurality of different gas void fractions, wherein the density decoupling parameter differs as function of gas void fraction; and
a model configured to determine the density decoupling parameter as a function of gas void fraction.

11. The improved Coriolis meter of claim 10 further comprising the processor configured to determine a density of the liquid phase of the process fluid.

12. The improved Coriolis meter of claim 11 wherein the model is in accordance with the following:

$$\rho_{meas}=(1-\{k_d(\alpha)\}\alpha+G_d(f_{red})^2)\rho_{liq}$$

where $\rho_{meas}$ is a reported density of the process fluid, $\{k_d(\alpha)\}$ is the density decoupling parameter as a function of the gas void fraction, $\alpha$ is the gas void fraction, $G_d$ is a density compressibility constant, $f_{red}$ is any of the first natural frequency of a process conveying flow tube and the second natural frequency of the process conveying flow tube and $\rho_{liq}$ is the density of the liquid phase of the process fluid.

13. The improved Coriolis meter of claim 11 wherein the model comprises a low-order parametric model configured to determine the density decoupling parameter.

14. The improved Coriolis meter of claim 13 wherein the low-order parametric model is in accordance with the following:

$$k_d=k_{d_{11}}+(k_{dmax}-k_{d_{11}})(1-e^{-\beta\alpha})$$

where $k_d$ is the density decoupling parameter, $\alpha$ is the gas void fraction, $k_{d_{11}}$ is the density decoupling parameter when $\alpha=0$ and $\beta$ is a fit parameter, $k_{dmax}$ is the maximum value of the density decoupling parameter.

15. The improved Coriolis meter of claim 10 wherein the model is configured to determine the density decoupling parameter as a function of gas void fraction comprises an optimization procedure.

16. The improved Coriolis meter of claim 15 wherein the optimization procedure includes an error function and wherein the model configured to determine the density decoupling parameter as a function of gas void fraction is configured to minimize an error of measuring of any of the first natural frequency of a process conveying flow tube, the second natural frequency of the process conveying flow tube and the sound speed of the process fluid.

17. The improved Coriolis meter of claim 10 wherein the model is configured to determine the density decoupling parameter wherein the density decoupling parameter varies with gas void fraction.

18. The improved Coriolis meter of claim 17 wherein:
the bubbly mixture comprises a plurality of bubbles;
the density decoupling parameter includes a fixed limit of $k_{dmax}=3$;
the density decoupling parameter varies between 1 and 3; and
wherein the plurality of bubbles are fully coupled to the liquid phase when the density decoupling parameter equals 1 and the plurality of bubbles are fully decoupled from the liquid phase when the density decoupling parameter equals 3.

* * * * *